United States Patent
Bae et al.

(10) Patent No.: US 9,605,369 B2
(45) Date of Patent: Mar. 28, 2017

(54) WASHING MACHINE AND MANUFACTURING METHOD OF BALANCER THEREOF

(71) Applicant: SAMSUNG ELECTRONICS CO., LTD., Suwon-si, Gyeonggi-do (KR)

(72) Inventors: Il Sung Bae, Seongnam-si (KR); Jae Seuk Park, Yongin-si (KR); Moo Hyung Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 432 days.

(21) Appl. No.: 14/281,292

(22) Filed: May 19, 2014

(65) Prior Publication Data

US 2014/0366590 A1    Dec. 18, 2014

(30) Foreign Application Priority Data

Jun. 13, 2013 (KR) .................. 10-2013-0067903

(51) Int. Cl.
*F16F 15/36*    (2006.01)
*D06F 37/24*    (2006.01)
*F16F 15/00*    (2006.01)

(52) U.S. Cl.
CPC ............ *D06F 37/24* (2013.01); *F16F 15/002* (2013.01); *F16F 15/36* (2013.01); *Y10T 29/49117* (2015.01)

(58) Field of Classification Search
CPC ...................................... F16F 15/36
See application file for complete search history.

(56) References Cited

U.S. PATENT DOCUMENTS

2012/0192362 A1    8/2012 Lee et al.

FOREIGN PATENT DOCUMENTS

| EP | 2520700 A1 | 11/2012 |
|---|---|---|
| KR | 10-2011-0010945 | 2/2011 |
| KR | 10-2011-0103576 | 9/2011 |

OTHER PUBLICATIONS

European Communication under Rule 71(3) EPC mailed Nov. 4, 2015 in related European Application No. 14171618.3.
Extended European Search Report dated Nov. 21, 2014 in corresponding European Patent Application No. 14171618.3.

*Primary Examiner* — Jason Ko
(74) *Attorney, Agent, or Firm* — Staas & Halsey LLP

(57) ABSTRACT

A washing machine includes a balancer to offset unbalanced load generated during rotation of a drum, wherein the balancer includes a balancer housing mounted at the drum, the balancer housing having an annular channel defined therein, a balancing module disposed in the annular channel such that the balancing module is movable when electric power from a power source outside a cabinet is supplied to the balancing module, a conductive film, one side of which is attached to an inside of the balancer housing and the other side of which is provided with a conductive rail to supply electric power to the balancing module, and an electric wire to electrically connect the power source outside the cabinet to the conductive rail.

12 Claims, 10 Drawing Sheets

WASHING MACHINE AND MANUFACTURING METHOD OF BALANCER THEREOF

CROSS-REFERENCE TO RELATED APPLICATIONS

This application claims the benefit of Korean Patent Application No. 10-2013-0067903, filed on Jun. 13, 2013 in the Korean Intellectual Property Office, the disclosure of which is incorporated herein by reference.

BACKGROUND

1. Field

Embodiments of the present disclosure relate to a washing machine having a balancer to offset unbalanced load.

2. Description of the Related Art

A washing machine is a machine that washes clothes using electric power. Generally, the washing machine includes a tub to contain wash water, a drum rotatably mounted in the tub, and a motor to rotate the drum.

The washing machine performs a series of washing cycles, such as washing, rinsing, and spin-drying, through rotation of the drum.

If laundry is not uniformly distributed in the drum but accumulates at one side during rotation of the drum, vibration and noise are generated due to eccentric rotation of the drum. According to circumstances, parts, such as the drum or the motor, of the washing machine may be damaged.

For this reason, the washing machine has a balancer that offsets unbalanced load generated in the drum to stabilize rotation of the drum.

Conventionally, however, the balancer is manually moved and, therefore, the balancer is not correctly moved to a position where unbalanced load of the drum will be offset. As a result, vibration and noise are not minimized.

SUMMARY

It is an aspect of the present disclosure to provide a balancing module with improved performance and a washing machine including the same.

It is another aspect of the present disclosure to provide a manufacturing method of a balancer that offsets unbalanced load generated during rotation of a drum.

It is a further aspect of the present disclosure to provide a manufacturing method of a conductive rail provided at a balancer housing to supply electric power to a balancing module.

Additional aspects of the disclosure will be set forth in part in the description which follows and, in part, will be apparent from the description, or may be learned by practice of the disclosure.

In accordance with an aspect of the present disclosure, a washing machine includes a cabinet, a drum rotatably disposed in the cabinet to receive laundry, and a balancer to offset unbalanced load generated during rotation of the drum, wherein the balancer includes a balancer housing mounted at the drum, the balancer housing having an annular channel defined therein, a balancing module disposed in the annular channel such that the balancing module is movable when electric power from a power source outside the cabinet is supplied to the balancing module, a conductive film, one side of which is attached to an inside of the balancer housing and the other side of which is provided with a conductive rail to supply electric power to the balancing module, and an electric wire to electrically connect the power source outside the cabinet to the conductive rail.

The conductive rail may include a first rail forming a positive pole and a second rail forming a negative pole, the second rail being parallel to the first rail.

The conductive rail may include an annular rail part and a terminal part protruding from the rail part to be electrically connected to the outside power source.

The washing machine may further include a reinforcing film attached to the terminal part to increase stiffness of the terminal part.

The washing machine may further include a connector coupled to an outside of the balancer housing to electrically connect the conductive rail to the electric wire.

The balancer housing may include a first housing having an opening, an outer wall, an inner wall facing the outer wall, the inner wall being closer to a drive shaft of the drum than the outer wall, and a connection wall connected between the outer wall and the inner wall, the connection wall being disposed more inwardly of the drum than the opening, and a second housing coupled to the opening of the first housing to define the annular channel together with the first housing, and the conductive film may be attached to an inside of the connection wall of the first housing.

The conductive film may be formed of any one selected from among polyethylene terephthalate (PET), polypropylene (PP), and low-density polyethylene (LDPE).

The conductive rail may be formed of any one selected from between aluminum and copper.

The conductive rail may be formed by laminating a thin film sheet of any one selected from between aluminum and copper to the conductive film and etching the thin film sheet.

Alternatively, the conductive rail may be formed by printing paint of any one selected from between aluminum and copper on the conductive film through a silk screen.

The conductive film may be bonded to the balancer housing using a bonding agent.

Alternatively, the conductive film may be fixed to the balancer housing using in-mold labeling (IML).

In accordance with another aspect of the present disclosure, a manufacturing method of a balancer of a washing machine includes injection molding a first housing, injection molding a second housing forming an annular channel together with the first housing, forming a conductive rail on a conductive film, attaching the conductive film to an inside of the first housing, inserting a balancer module into the annular channel, and welding the first housing and the second housing.

The forming may include laminating a thin film sheet of any one selected from between aluminum and copper to the conductive film and etching the thin film sheet.

Alternatively, the forming may include printing paint of any one selected from between aluminum and copper on the conductive film through a silk screen.

The attaching may include bonding the conductive film to the balancer housing using a bonding agent.

Alternatively, the attaching may include injection molding the first housing while inserting the conductive film.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

Figure 1:
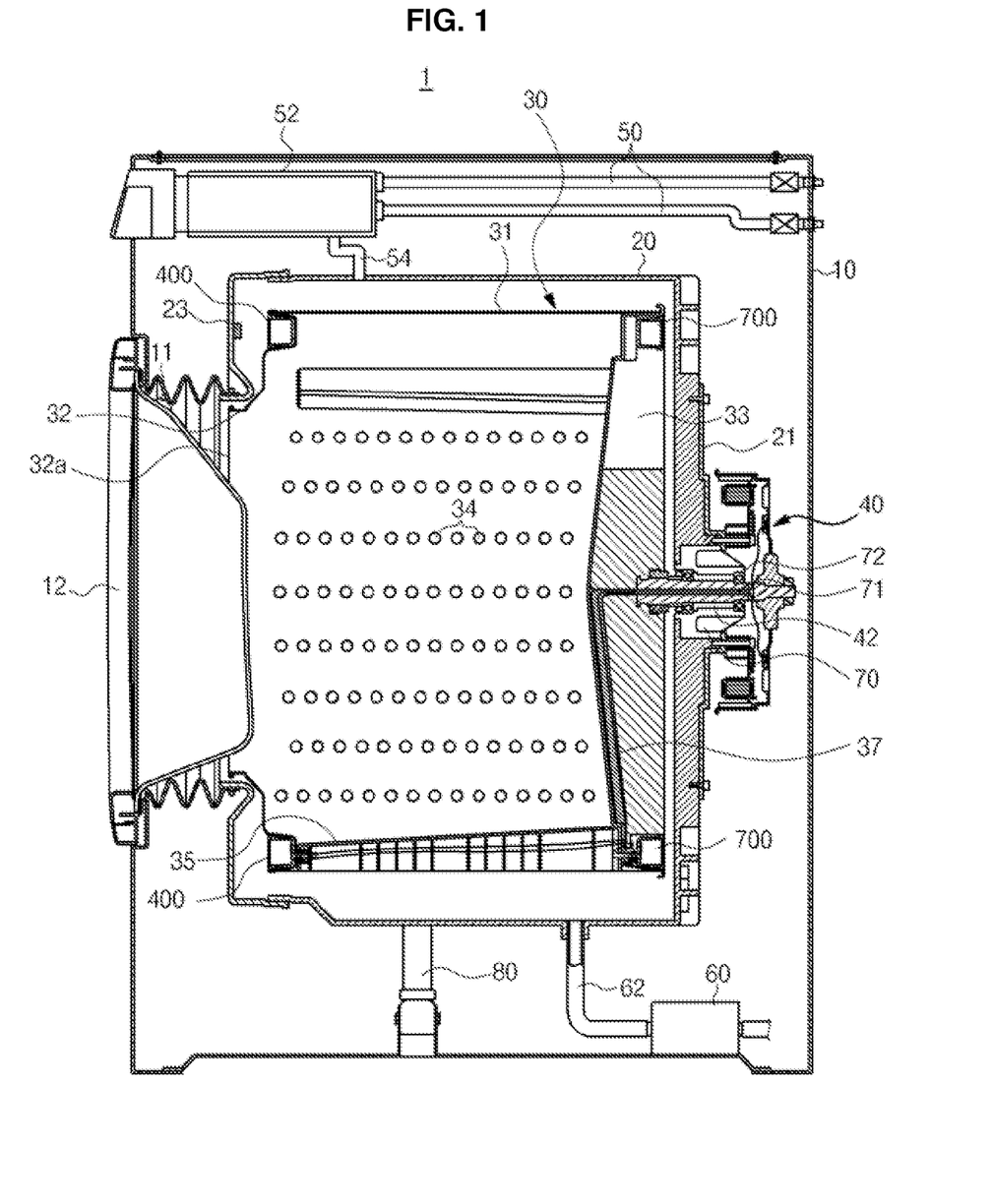
FIG. 1 is a view showing construction of a washing machine according to an embodiment of the present disclosure.
Figure 2:
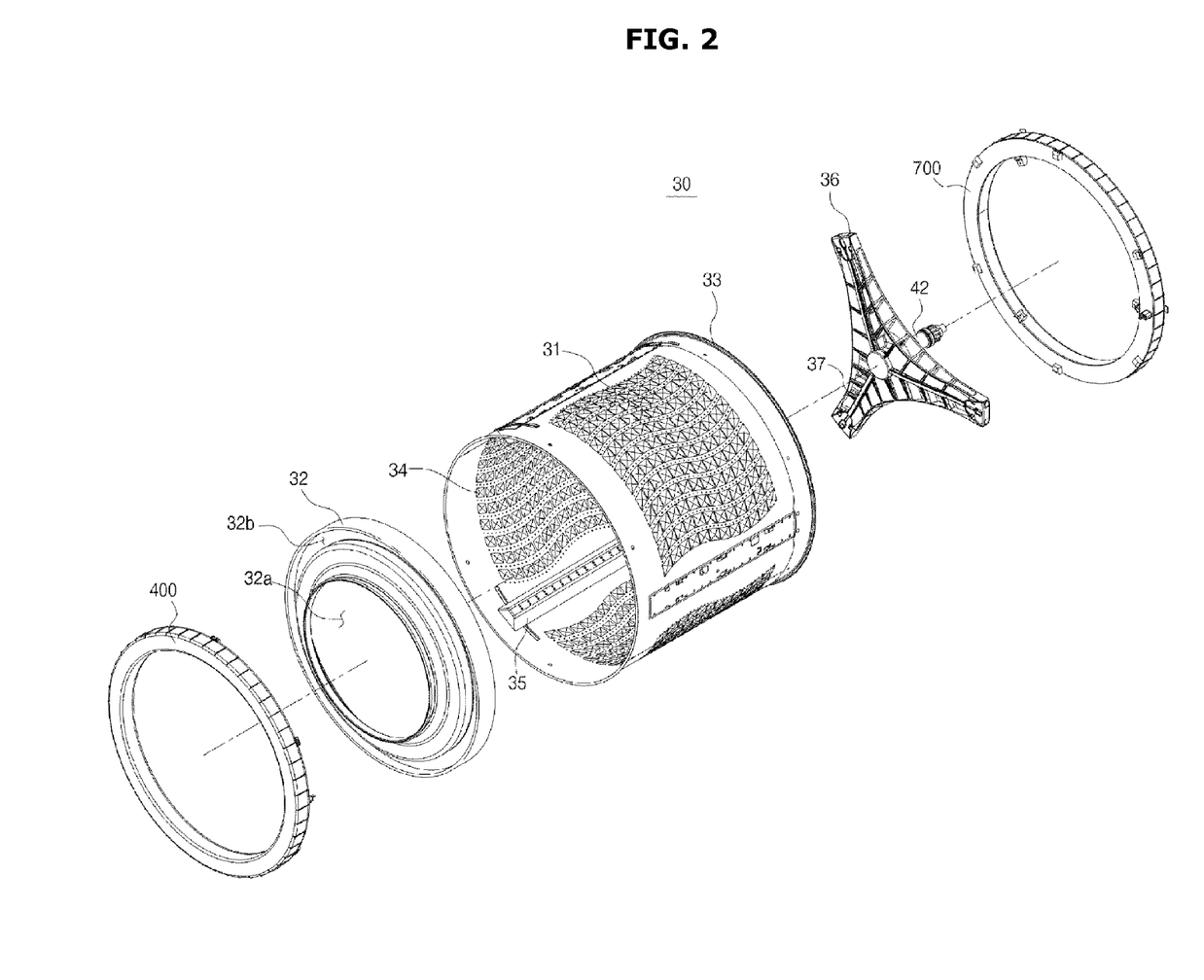
FIG. 2 is an exploded perspective view showing construction of a drum of the washing machine of FIG. 1.

FIG. 1 is a view showing construction of a washing machine according to an embodiment of the present disclosure. FIG. 2 is an exploded perspective view showing construction of a drum of the washing machine of FIG. 1.

As shown in FIG. 1, a washing machine 1 includes a cabinet 10 forming the external appearance thereof, a tub 20 disposed in the cabinet 10, a drum 30 rotatably disposed in the tub 20, and a motor 40 to drive the drum 30. According to embodiments, the tub 20 may be integrated with the cabinet 10 or omitted.

An introduction port 11, through which laundry is introduced into the drum 30, is formed at the front of the cabinet 10. The introduction port 11 is opened and closed by a door 12 mounted at the front of the cabinet 10.

Above the tub 20 is mounted a water supply pipe 50 to supply wash water to the tub 20. One side of the water supply pipe 50 is connected to an external water supply source (not shown) and the other side of the water supply pipe 50 is connected to a detergent supply unit 52.

The tub 20 is supported by a damper 80. The damper 80 is connected between the inside bottom of the cabinet 10 and the outer surface of the tub 20.

The detergent supply unit 52 is connected to the tub 20 via a connection pipe 54. Water, supplied through the water supply pipe 50, is supplied into the tub 20 together with detergent via the detergent supply unit 52.

Under the tub 20 are provided a drainage pump 60 and a drainage pipe 62 to discharge water in the tub 20 from the cabinet 10.

The drum 30 includes a cylinder part 31, a front plate 32 disposed at the front of the cylinder part 31, and a rear plate 33 disposed at the rear of the cylinder part 31. An opening 32a, through which laundry is introduced and removed, is formed at the front plate 32.

The drum 30 is provided at the circumference thereof with a plurality of through holes 34, through which wash water flows. The drum 30 is provided at the inner circumference thereof with a plurality of lifters 35, by which laundry is raised and dropped when the drum 30 is rotated.

A drive shaft 42 is disposed between the drum 30 and the motor 40. One end of the drive shaft 42 is connected to the rear plate 33 of the drum 30 and the other end of the drive shaft 42 extends outward from the rear wall of the tub 20. When the drive shaft 42 is driven by the motor 40, the drum 30 connected to the drive shaft 42 is rotated about the drive shaft 42.

At the rear wall 21 of the tub 20 is mounted a bearing housing 70 to rotatably support the drive shaft 42. The bearing housing 70 may be made of an aluminum alloy. The bearing housing 70 may be inserted into the rear wall of the tub 20 when the tub 20 is injection molded. Between the bearing housing 70 and the drive shaft 42 are mounted bearings 72 to smoothly rotate the drive shaft 42.

During a washing cycle, the motor 40 rotates the drum 30 in alternating directions at low speed. As a result, laundry in the drum 30 is repeatedly raised and dropped such that contaminants are removed from the laundry.

During a spin-drying cycle, the motor 40 rotates the drum 30 in one direction at high speed. As a result, water is separated from laundry by centrifugal force applied to the laundry.

If the laundry is not uniformly distributed in the drum 30 but accumulates at one side when the drum 30 is rotated during spin-drying, rotation of the drum 30 is unstable, generating vibration and noise.

For this reason, the washing machine 1 includes a balancer 400 and 700 to stabilize rotation of the drum 30. The balancer 400 and 700 may include a front balancer 400 disposed at the front of the drum 30 and a rear balancer 700 disposed at the rear of the drum 30.

The balancer 400 and 700 of the washing machine 1 includes an electric wire 71, through which electric power from a power source outside the cabinet 10 is supplied to the balancer 400 and 700. The electric wire 71 is electrically connected between the power source outside the cabinet 10 and the balancer 400 and 700 via a hollow part of the drive shaft 42, a guide part 37 formed at a flange 36, and the lifters 35 formed at the inner circumference of the drum 30.

As shown in FIG. 2, the drum 30 includes the cylinder part 31, the front plate 32 disposed at the front of the cylinder part 31, and the rear plate 33 disposed at the rear of the cylinder part 31. The opening 32a, through which laundry is introduced and removed, is formed at the front plate 32.

The front plate 32 has a step part, which protrudes forward. The front balancer 400 may be mounted in the step part of the front plate 32.

The rear plate 33 is disposed at the rear of the cylinder part 31 to cover the rear of the cylinder part 31. The flange 36, which is coupled to the drive shaft 42, may be coupled to the rear of the rear plate 33.

The drive shaft 42 may be coupled to the center of the flange 36. The guide part 37, through which electric wire 71 extends, may be formed at the flange 36. The rear balancer 700 may be mounted to the rear of the flange 36.

The lifters 35 may be mounted at the inner circumference of the cylinder part 31 of the drum 30.

The through holes 34, through which the inside and outside of the drum 30 communicate with each other, may be formed at the cylinder part 31 of the drum 30

Figure 3:
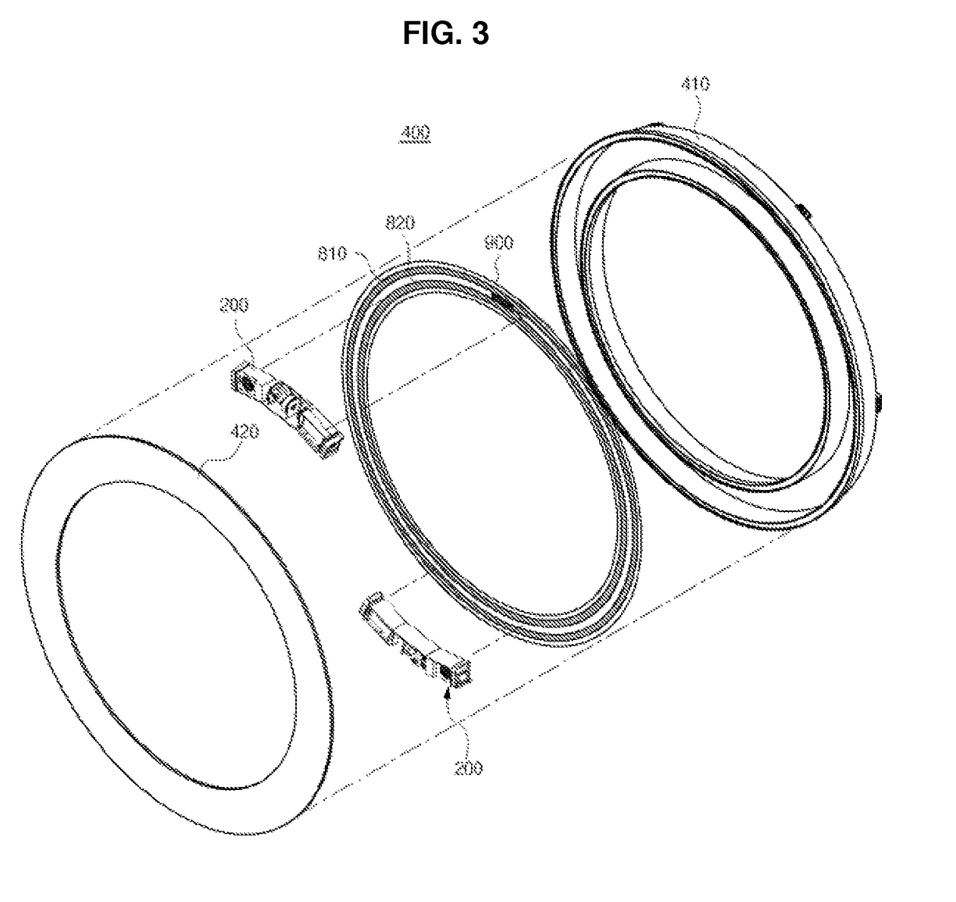
FIG. 3 is an exploded view showing construction of a balancer of the washing machine of FIG. 1.
Figure 4:
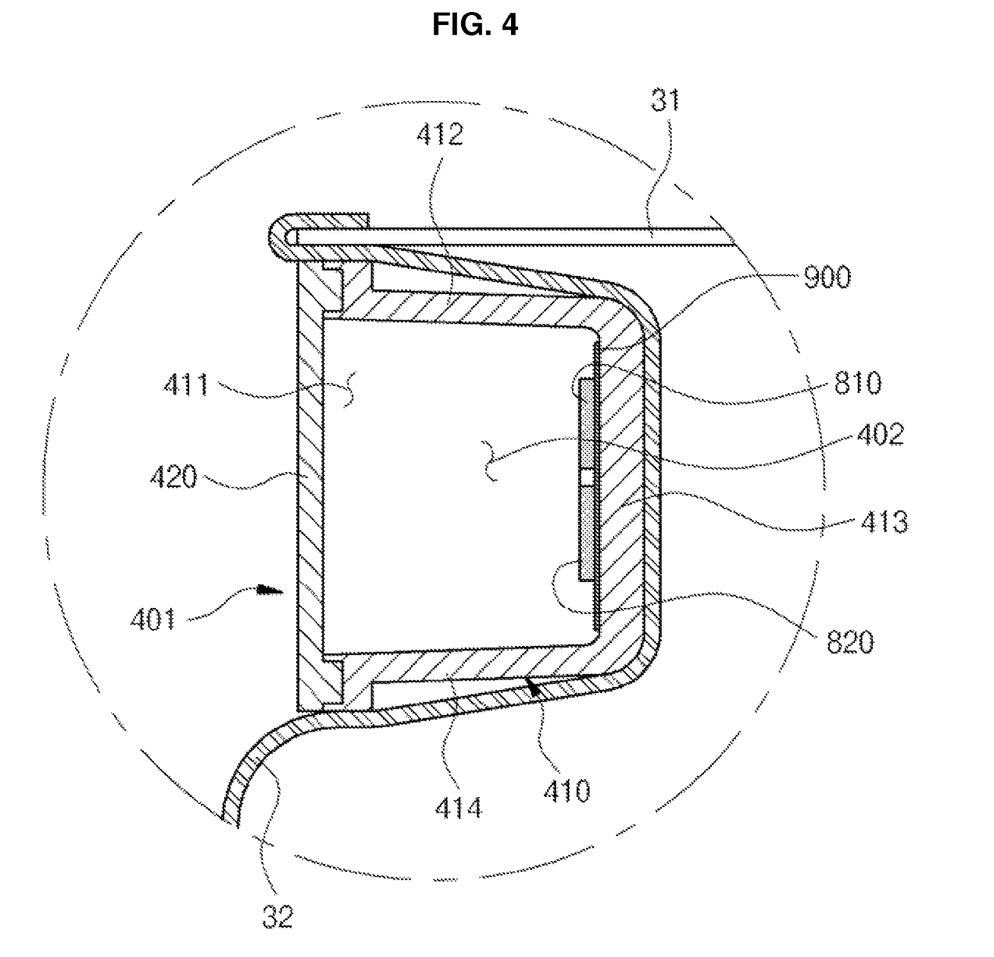
FIG. 4 is a sectional view of the balancer of the washing machine of FIG. 1.

FIG. 3 is an exploded view showing construction of the balancer of the washing machine of FIG. 1 and FIG. 4 is a sectional view of the balancer of the washing machine of FIG. 1.

As shown in FIGS. 3 and 4, the front balancer 400 and the rear balancer 700 are symmetric in construction. Hereinafter, therefore, the construction of the front balancer 400 will be described in detail and the construction of the rear balancer 700 will be omitted.

The balancer 400 is mounted in a balancer mounting groove 32b (see FIG. 2) formed at the edge of the front plate 32 in the circumferential direction thereof. Although not shown, the balancer 400 mounted in the balancer mounting groove 32b may be securely coupled to the drum 30 by fastening members, such as screws.

The balancer 400 includes a balancer housing 401 having an annular channel 402 and at least one balancing module 200 movably disposed in the annular channel 402 of the balancer housing 401 to offset unbalanced load generated during rotation of the drum 30.

The balancer housing 401 may include a first housing 410 and a second housing 420 coupled to the first housing 410.

The first housing 410 may have approximately a bracket shape. That is, the first housing 410 may include an opening 411, an outer wall 412, an inner wall 414 facing the outer wall 412, the inner wall 414 being closer to the drive shaft 42 of the drum 30 than the outer wall 412, and a connection wall 413 connected between the outer wall 412 and the inner wall 414.

The connection wall 413 is disposed more inwardly of the drum 30 than the opening 411. For the front balancer 400, therefore, the connection wall 413 of the first housing 410 is disposed more backward than the opening 411. The rear balancer 600 has a structure reverse to that of the front balancer 400.

The outer wall 413 may be pushed by the balancing module 200 due to centrifugal force during rotation of the drum 30.

The second housing 420 may be coupled to the opening 411 of the first housing 410 to define the annular channel 402 together with the first housing 410. The first housing 410 and the second housing 420 may be coupled to each other by thermal welding.

The reason that the bracket-shaped first housing 410 is mounted to the drum 30 such that the connection wall 413 is disposed more inward of the drum 30 than the opening 411 is that the interior space of the drum 30 is more easily secured than a reverse structure.

This is because the distance between the outer wall 412 and the inner wall 414 gradually increases from the connection wall 413 to the opening 411 during injection molding of the bracket-shaped first housing 410 in consideration of characteristics of a mold.

Meanwhile, the balancer 400 further includes a conductive film 900, one side of which is attached to the inside of the balancer housing 401 and the other side of which is provided with conductive rails 810 and 820 to supply electric power to the balancing module 200.

The conductive rails 810 and 820 may be formed of metal, such as aluminum or copper, exhibiting high electric conductivity. The conductive rails 810 and 820 include a first rail 810 forming a positive pole and a second rail 820 forming a negative pole. The first rail 810 and the second rail 820 may include annular rail parts 811 and 821 and terminal parts 812 and 822 protruding from the rail parts 811 and 821 to be electrically connected to an external power source.

The conductive film 900 may be attached to the inside of the connection wall 413 of the first housing 410 of the balancer housing 401. Alternatively, the conductive film 900 may be attached to the inside of the second housing 420.

A material for the conductive film 900 is not particularly restricted. For example, the conductive film 900 may be formed of polyethylene terephthalate (PET), polypropylene (PP), or low-density polyethylene (LDPE).

Figure 5:
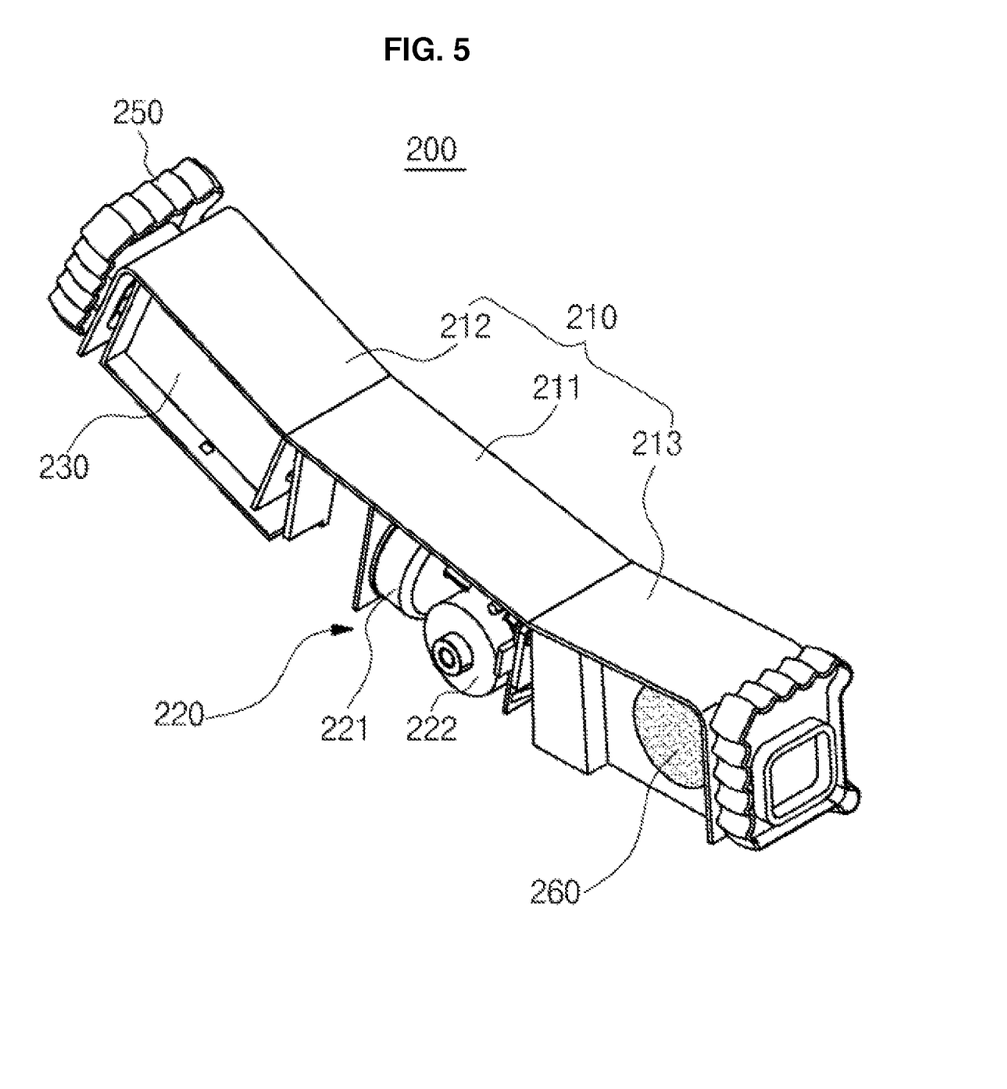
FIG. 5 is a view showing a balancing module of the washing machine of FIG. 1.
Figure 6:
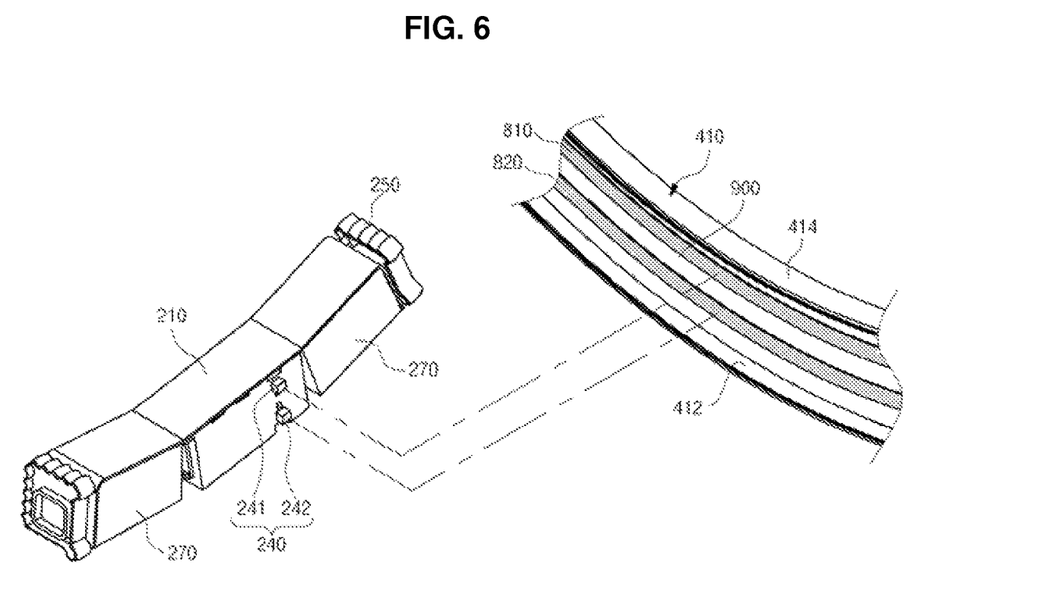
FIG. 6 is a view showing a contact structure between a conductive rail and the balancing module of the washing machine of FIG. 1.

FIG. 5 is a view showing the balancing module of the washing machine of FIG. 1. FIG. 6 is a view showing a contact structure between the balancing module and the conductive rail of the washing machine of FIG. 1.

Referring to FIGS. 1 to 6, the balancing module 200 includes a main plate 210.

The main plate 210 may include a middle plate 211 and side plates 212 and 213 formed at opposite sides of the middle plate 211 such that the side plates 212 and 213 are bent at a predetermined angle to the middle plate 211. Since the middle plate 211 and the side plates 212 and 213 have the predetermined angle therebetween, the balancing module 200 may be easily movable along the annular channel 402.

A mass body 270 may be mounted to each of the side plates 212 and 213. The mass body 270 offsets unbalanced load generated when laundry in the drum 30 accumulates at one side such that the drum 30 naturally rotates.

A circuit board 230 may be mounted at the front of one of the mass bodies 270. Various devices to operate a drive unit 220, which will hereinafter be described, are mounted at the circuit board 230.

A position recognition unit 260 may be mounted at the other mass body 270. The position recognition unit 260 may be a magnetic body including a permanent magnet, a light emission part to emit light, or a reflective plate to reflect emitted light.

A position sensor 23 may be mounted at a portion of the tub 20 corresponding to the balancer housing 401. The position sensor 23 may sense the position of the balancing module 200 to determine where the balancing module 200 is currently positioned. The position sensor 23 may be a hall sensor, an infrared sensor, or an optical fiber sensor. When the position sensor 23 is a hall sensor, the position recognition unit 260 may be a magnetic body. When the position sensor 23 is an infrared sensor, the position recognition unit 260 may be a light emission part. When the position sensor 23 is an optical fiber sensor, the position recognition unit 260 may be a reflective plate.

A bearing 250 may be coupled to one end of each of the side plates 212 and 213. The bearing 250 prevents collision between the balancing module 200 and the inside of the balancer housing 110. In addition, the bearing 250 restrains excessive free movement of the balancing module 200 in the balancer housing 110 such that the balancing module 200 is fixed at a correct position where unbalanced load will be offset.

A drive unit 220 may be mounted at the middle plate 211. The drive unit 220 may include a drive wheel 222 to directly move the balancing module 200 and a drive motor 221 to drive the drive wheel 222.

A brush 240 may be provided at the rear of the drive unit 220. The brush 240 is electrically connected to the conductive rails 810 and 820 of the balancer housing 110 through physical contact.

Even when the balancing module 200 is moved, the brush 240 remains in contact with the conductive rails 810 and 820 such that electric power is continuously supplied to the balancing module 200.

As the conductive rails 810 and 820 include the first rail 810 forming the positive pole and the second rail 820 forming the negative pole, the brush 240 may include a first brush 241 and a second brush 242. The first brush 241 and the second brush 242 may contact the first rail 810 and the second rail 820.

Since the brush 240 contacts the conductive rails 810 and 820 in the drum 30, which vibrates during rotation, the brush 240 may be damaged. For this reason, an inner end of the brush 240 may be supported by an elastic body.

Figure 7:
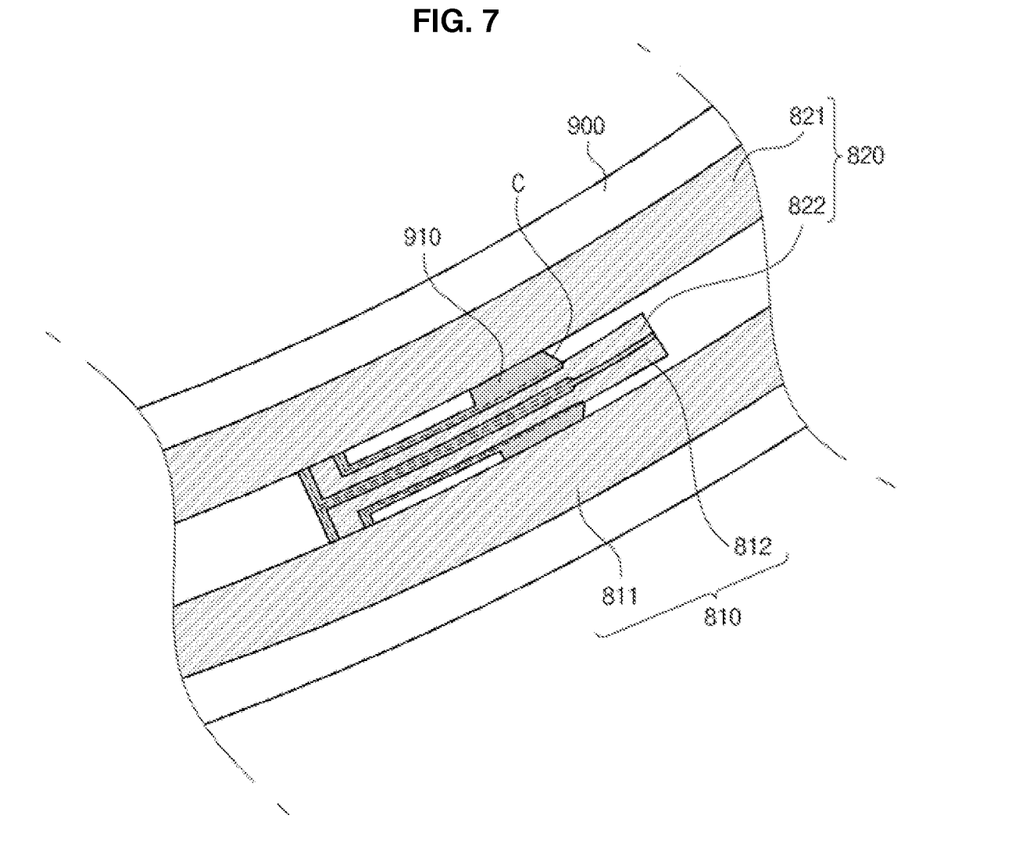
FIG. 7 is a view showing a conductive film of the washing machine of FIG. 1.
Figure 8:
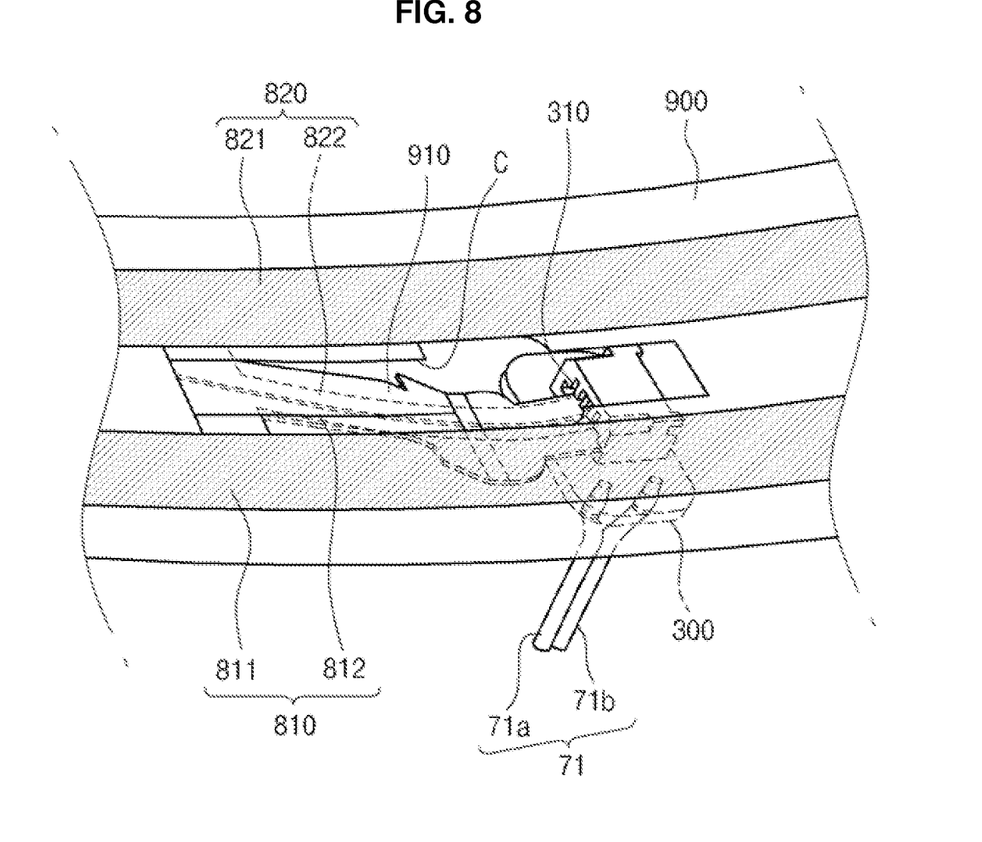
FIG. 8 is a view showing a connection structure between a connector and the conductive rail of the washing machine of FIG. 1.
Figure 9:
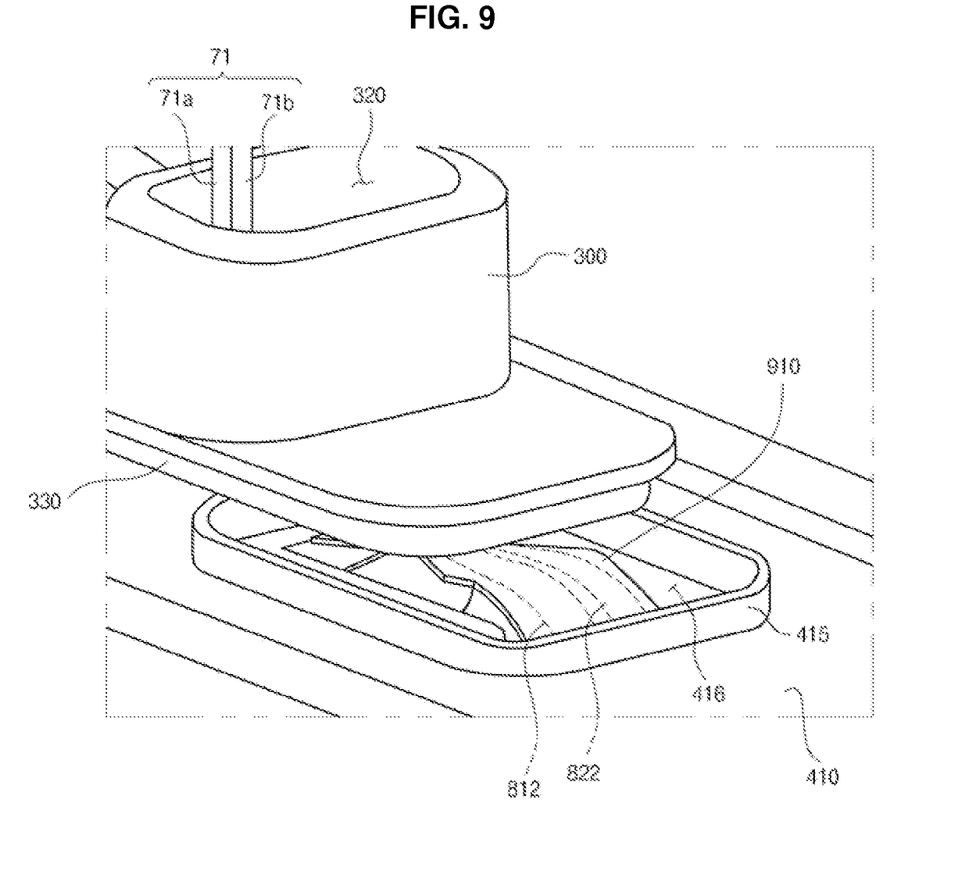
FIG. 9 is a view showing the connector of the washing machine of FIG. 1.
Figure 10:
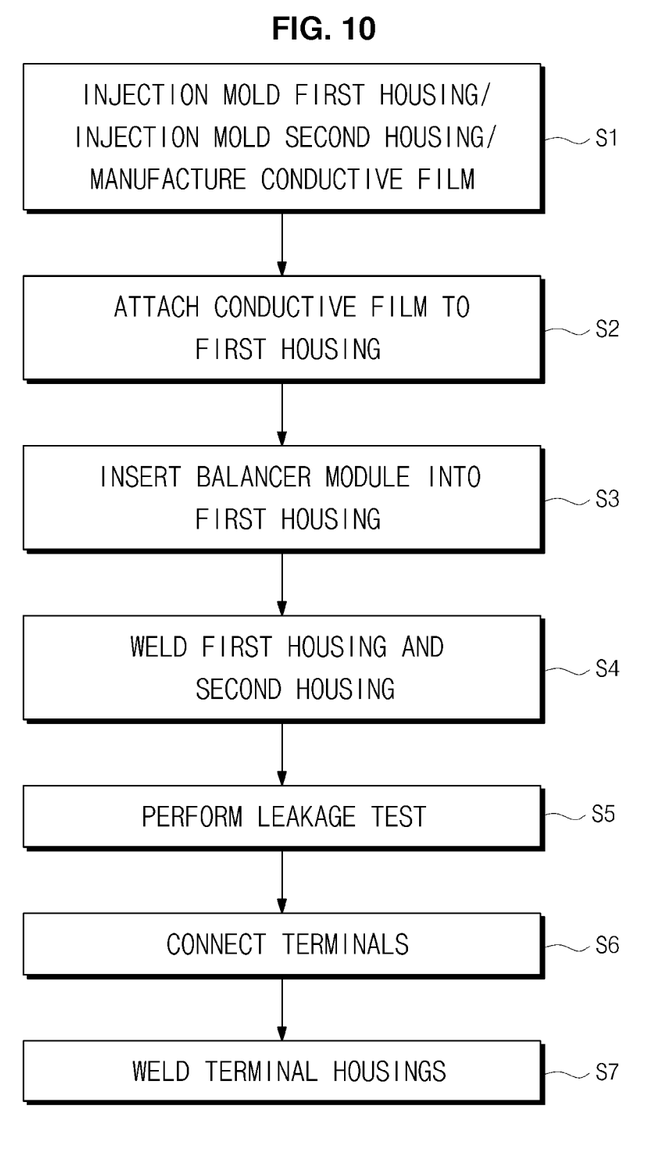
FIG. 10 is a flowchart showing a manufacturing method of the balancer of the washing machine of FIG. 1.

FIG. 7 is a view showing the conductive film of the washing machine of FIG. 1, FIG. 8 is a view showing a connection structure between a connector and the conductive rail of the washing machine of FIG. 1, and FIG. 9 is a view showing the connector of the washing machine of FIG. 1. FIG. 10 is a flowchart showing a manufacturing method of the balancer of the washing machine of FIG. 1.

A manufacturing method of the washing machine 1 including a method of forming the conductive rails 810 and 820 at the conductive film 900 and a method of attaching the conductive film 900 to the first housing 410 will be described with reference to FIGS. 7 to 10.

The method of forming the conductive rails 810 and 820 at the conductive film 900 is as follows.

First, metal etching may be used. A thin film sheet of metal, such as aluminum or copper, may be laminated to the conductive film 900 by dry laminating and a portion of the metal thin film sheet may be melted by metal etching to form the conductive rails 810 and 820 including the rail parts 811 and 821 and the terminal parts 812 and 822.

The metal thin film sheet may be coated with a thin film antioxidant to prevent oxidation of aluminum or copper.

Second, printing may be used. The conductive rails 810 and 820 including the rail parts 811 and 821 and the terminal parts 812 and 822 may be directly printed on the conductive film 900 by silk screen printing using aluminum or copper paint.

The method of attaching the conductive film 900 having the conductive rails 810 and 820 to the balancer housing 401 is as follows.

First, the conductive film 900 may be inserted during injection molding of the balancer housing 401. That is, in-mold labeling (IML) may be used. The conductive film 900 may be cut to fit in an injection mold of the first housing 410 and the first housing 410 may be injection molded in a state in which the conductive film 900 is placed in the injection mold such that the conductive film 900 and the first housing 410 are integrated.

Second, the conductive film 900 may be bonded to the first housing 410 using a bonding agent, such as double-sided tape or adhesive. Electric discharge machining, such as corona machining or plasma machining, may be performed to increase the surface energy of the conductive film 900 and the first housing 410, thereby increasing bonding force. In addition, a fixing structure, such as riveting, may be added.

Meanwhile, a connector 300 may be coupled to the first housing 410 to connect the conductive rails 810 and 820 to an electric wire 71. A pair of electric wires 71a and 71b respectively forming a positive pole and a negative pole may be electrically connected to the connector 300 through opening 320 and the conductive rails 810 and 820 may be connected to the connector 300 to achieve electrical connection between the conductive rails 810 and 820 and the electric wires 71a and 71b.

A first coupling part 415 protruding for coupling of the connector 300 may be provided at the outside of the first housing 410 and a second coupling part 330 protruding to be coupled to the first coupling part 415 may be provided at the connector 300. The first housing 410 may have an opening 416, through which the conductive rails 810 and 820 may be drawn from the first housing 410 such that the conductive rails 810 and 820 are connected to a connection part 310 of the connector 300.

Meanwhile, a reinforcing film 910 to increase stiffness of the terminal parts 812 and 822 of the conductive rails 810 and 820 when the terminal parts 812 and 822 are connected to the connector 300 may be attached to the terminal parts 812 and 822.

As shown in FIG. 8, the reinforcing film 910 may be attached to the terminal parts 812 and 822, an edge C of the reinforcing film 910 may be cut, and the terminal parts 812 and 822 may be connected to the connection part 310 of the connector 300 to achieve electrical connection between the conductive rails 810 and 820 and the electric wires 71a and 71b.

Hereinafter, a manufacturing method of the balancer 400 according to the embodiment of the present disclosure will be described with reference to FIGS. 1 to 10. The manufacturing method of the balancer 400 is as follows.

First, a first housing 410 and a second housing 420 are injection molded and a conductive film 900 is manufactured (S1). As previously described, the conductive film 900 may be manufactured by metal etching or silk screen printing.

Subsequently, the conductive film 900 is attached to the inside of a connection wall 413 of the first housing 410 (S2). At this time, the conductive film 900 may be attached to the connection wall 413 of the first housing 410 using a bonding agent. Alternatively, the conductive film 900 may be inserted into a mold during injection molding of the first housing 410 such that the conductive film 900 is integrated with the first housing 410.

Subsequently, a balancing module 200 is inserted into an annular channel 402 defined by the first housing 410 and the second housing 420 (S3).

Subsequently, the first housing 410 and the second housing 420 are welded to complete a balancer housing 401 (S4).

Subsequently, a leakage test of a coupling portion between the first housing 410 and the second housing 420 is performed (S5), terminal parts 812 and 822 of conductive rails 810 and 820 are connected to a connector 300 (S6), and the connector 300 is connected to the first housing 410 (S7).

As is apparent from the above description, the balancer module disposed in the balancer housing actively moves to rapidly offset unbalanced load present in the drum.

In addition, electric power generated from the external power source is simply and efficiently transmitted to the balancer module.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A washing machine comprising:
a cabinet;
a drum rotatably disposed in the cabinet to receive laundry; and
a balancer to offset unbalanced load generated during rotation of the drum,
wherein the balancer comprises
a balancer housing mounted at the drum, the balancer housing having an annular channel defined therein;
a balancing module disposed in the annular channel such that the balancing module is movable when electric power from a power source outside the cabinet is supplied to the balancing module;

a conductive film, one side of which is attached to an inside of the balancer housing and the other side of which is provided with a conductive rail to supply electric power to the balancing module; and an electric wire to electrically connect the power source outside the cabinet to the conductive rail.

2. The washing machine according to claim 1, wherein the conductive rail comprises a first rail forming a positive pole and a second rail forming a negative pole, the second rail being parallel to the first rail.

3. The washing machine according to claim 1, wherein the conductive rail comprises an annular rail part and a terminal part protruding from the rail part to be electrically connected to the outside power source.

4. The washing machine according to claim 3, further comprising a reinforcing film attached to the terminal part to increase stiffness of the terminal part.

5. The washing machine according to claim 1, further comprising a connector coupled to an outside of the balancer housing to electrically connect the conductive rail to the electric wire.

6. The washing machine according to claim 1, wherein the balancer housing comprises:

a first housing having an opening, an outer wall, an inner wall facing the outer wall, the inner wall being closer to a drive shaft of the drum than the outer wall, and a connection wall connected between the outer wall and the inner wall, the connection wall being disposed more inwardly of the drum than the opening; and a second housing coupled to the opening of the first housing to define the annular channel together with the first housing, and the conductive film is attached to an inside of the connection wall of the first housing.

7. The washing machine according to claim 1, wherein the conductive film is formed of any one selected from among polyethylene terephthalate (PET), polypropylene (PP), and low-density polyethylene (LDPE).

8. The washing machine according to claim 1, wherein the conductive rail is formed of any one selected from between aluminum and copper.

9. The washing machine according to claim 1, wherein the conductive rail is formed by laminating a thin film sheet of any one selected from between aluminum and copper to the conductive film and etching the thin film sheet.

10. The washing machine according to claim 1, wherein the conductive rail is formed by printing paint of any one selected from between aluminum and copper on the conductive film through a silk screen.

11. The washing machine according to claim 1, wherein the conductive film is bonded to the balancer housing using a bonding agent.

12. The washing machine according to claim 1, wherein the conductive film is fixed to the balancer housing using in-mold labeling (IML).

* * * * *